(12) United States Patent
Mase

(10) Patent No.: US 6,606,635 B1
(45) Date of Patent: Aug. 12, 2003

(54) DATA PROCESSING APPARATUS

(75) Inventor: Atsushi Mase, Aichi (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/423,092

(22) PCT Filed: Mar. 23, 1998

(86) PCT No.: PCT/JP98/01241
§ 371 (c)(1),
(2), (4) Date: Nov. 2, 1999

(87) PCT Pub. No.: WO99/49374
PCT Pub. Date: Sep. 30, 1999

(51) Int. Cl.[7] .............................................. G06F 17/30
(52) U.S. Cl. ..................... 707/103 Y; 707/3; 707/500; 709/328; 710/242
(58) Field of Search ........................... 707/500, 3, 103; 709/220, 230, 203–204, 227, 102, 65, 69, 328, 228, 100–104.1; 705/65, 69; 345/502; 714/746, 4; 710/242

(56) References Cited

U.S. PATENT DOCUMENTS 5,457,780 A * 10/1995 Shaw et al.
5,806,068 A * 9/1998 Shaw et al. .................. 707/103
5,835,726 A * 11/1998 Shwed et al. ................ 709/229
5,855,905 A * 1/1999 Oettel et al. ................. 424/422

FOREIGN PATENT DOCUMENTS

| | | | |
|---|---|---|---|
| JP | 62-266604 | 11/1987 | G05B/19/02 |
| JP | 3-283937 | 12/1991 | H04L/12/40 |
| JP | 4-123545 | 4/1992 | H04L/12/40 |
| JP | 4-284098 | 10/1992 | H04Q/9/00 |
| JP | 6-14060 | 1/1994 | H04L/13/08 |
| JP | 6-28274 | 2/1994 | G06F/13/00 |

* cited by examiner

*Primary Examiner*—John Breene
*Assistant Examiner*—Mohammad Ali
(74) *Attorney, Agent, or Firm*—Sughrue Mion, PLLC

(57) ABSTRACT

The present invention relates to a data processing apparatus for transmitting data to and receiving data from a device to be controlled which is connected to the data processing apparatus by way of a communications line. When application programs submit a request to the device for control, a control request is issued from a plurality of application programs in the form of a unified common packet. A communications manager converts the control request into an actual packet to be actually transmitted to the device to be controlled and outputs the thus-converted actual packet to the device.

3 Claims, 12 Drawing Sheets

DATA PROCESSING APPARATUS

FIELD OF THE INVENTION

The present invention relates to a data processing apparatus which transmits or receives to and from devices to be controlled, each having a storage device, such as a plurality of programmable controllers (hereinafter referred to as "PCs"), data reserved in the PCs such as a PC execution program, parameters, or device data, by means of PC communications means.

BACKGROUND OF THE INVENTION

An example of a conventional data processing apparatus will now be described by reference to FIGS. 7 through 13.

FIG. 7 is a block diagram showing the configuration of a PC peripheral apparatus which is connected to two types of PCs and serves as a data processing device. In the drawing, reference numeral 1 designates a PC peripheral apparatus for controlling a CRT 2, a keyboard 3, and a mouse 4, which serve as input/output devices, and PC 6a and PC 6b connected to the PC peripheral apparatus by means of a communications line. Reference numeral 2 designates a CRT; 3 designates a keyboard; 4 designates a mouse; and 5 designates an auxiliary storage device. The auxiliary storage device 5 stores a monitoring program file 14A which collects device data from the PC 6a or 6b and displays the contents of the thus-collected device data on the CRT 2; an application program, such as a programming function program 15A, for offering a program development environment which prepares a user program for activating the PC 6a or 6c; and a PC communications means file 16 by means of which the monitoring program 14A and the programming function program file 15A communicate with the PC 6a or 6b.

Reference numeral 6 designates a PC which is connected to the PC peripheral apparatus 1 by way of a communications line and comprises the two PC 6a and PC 6b, whose internal memory devices differ in configuration from each other.

In the PC peripheral apparatus 1, reference numeral 7 designates a CPU which executes a program for communicating with the PC 6; 8 designates work-area memory for software which establishes communication between the PC peripheral apparatus 1 and the PC 6a and PC 6b; 9 designates an interface with the CRT 2; 10 designates an interface with the keyboard 3; 11 designates an interface with the mouse 4; 12 designates an interface with the auxiliary storage device 5; and 13 designates an interface with the PC 6a and PC 6b.

In the work-area memory 8, the monitoring program 14A, the programming function program 15A, and the PC communications means 16, which are stored in the auxiliary storage device 5, are expanded.

There is no requirement that the PC peripheral apparatus 1 be a dedicated apparatus. The PC peripheral apparatus 1 may be a commercially available personal computer, so long as the apparatus is equipped with at least the previously-described elements.

FIG. 8 is a memory status diagram representing the configuration of memory stored in the PC 6, showing the status of memory of the two types of PC 6a and PC 6b.

In the drawing, the internal memory of the PC 6 comprises: a parameter 100 which sets a program capacity required for activating the PC 6; a program 101 which is prepared by the user through use of the programming function program 15A and activates the PC 6; device memory 102 represented by designations, such as "X," "Y," "T," and "C," which abstractly express storage areas of bit or word size; device memory 102 which is an area of the PC 6 whose value is changed in accordance with the operation of a program; PC-type data 103 which include type-dependent data such as a type code; and PC internal data 104 which are prepared internally for the purpose of activating the PC 6. Addresses 105 at which the above elements are stored are determined.

Reference numeral 106 designates a diagram for specifically showing the status of memory of a device X, representing, for example, bit regions.

The memory of the PC 6a comprises a parameter 100a, a program 101a, device memory 102a, PC-type data 103a, PC internal data 104a, and an address 105a. The memory of the PC 6b comprises a parameter 10b, a program 101b, device memory 102b, PC-type data 103b, PC internal data 104b, and an address 105b. Although the memory devices of the PC 6a and PC 6b differ in configuration from each other according to the type of the PC, they have substantially the same functions.

FIG. 9 shows the configuration of the software which is executed in the work-area memory 8 of the PC peripheral apparatus and the flow of data exchanged between the work-area memory 8 and the PC 6a and PC 6b. As shown in the drawing, the software that runs on the work-area memory 8 is stored in the auxiliary storage device 5 and starts operation by being activated by the user through use of the keyboard 3 or the mouse 4. The monitoring program 14A comprises PC access data 14a used for establishing communication with the PC 6a or 6b, and unique address data 14b storing an address specifying which of the PC 6a and PC 6b access is made. The programming function program 15A comprises PC access data 15a used for establishing communication with the PC 6a or 6b, and unique address data 15b reserving an address specifying which of the PC 6a and PC 6b access is made.

The PC communications means 16 for exchanging data with the PC 6a and PC 6b is equipped with programs compatible with mediums such as serial interfaces RS232C and RS422 and Ethernet. When data are transmitted to or received from the PC 6a or 6b, the monitoring program 14A and the programming function program 15A receive or transmit data through use of the PC communications means 16. The monitoring program 14A and the programming function program 15A are exclusively controlled so as to avoid using the same medium; e.g., the RS232C interface, simultaneously.

FIG. 10 shows the configuration of PC access data executed in the work-area memory 8 of the PC peripheral apparatus.

In the drawing, reference numeral 14a designates PC access data of the monitoring program 14A. The PC access data 14a comprises a tag 141a; i.e., device data for specifying which of the PC 6a and PC 6b is to be monitored; and device data 142a which represents the status of devices of the respective PC 6a and PC 6b; for example, ON status of an input X0 device. Reference numeral 15a designates PC access data of the programming function program 15A. The PC access data 15a comprises a program 151a for activating the PC prepared by the user; a program comment 152a for making the program 151a easy to understand; a device comment 153a assigned to devices of the PC 6a and PC 6b; a parameter 154a storing definitions required for activating the PC 6a or 6b; and device data 155a which represent the status of devices of the PC 6a and PC 6b; for example, the ON status of an input X0 device.

FIG. 11 shows address data unique to the software executed in the work-area memory of the PC peripheral apparatus.

In the drawing, reference numerals 14b and 15b respectively designate unique address data comprising a PC memory header address; a work-area header address for saving a parameter; a file register segment header address, a monitor work-area header address, and a device register header address. The unique address data 14b and 15b represent header addresses at which data unique to the respective PCs are stored.

FIG. 12 is a schematic flowchart of a program of the PC communications means 16 that exchanges data with the PC 6a or 6b.

The PC communications means 16 is called to start operation by the monitoring program 14A and the programming function program 15A when there arises a need for exchanging data with the PC 6a or 6b.

In step S101, a determination is made as to with which of the PCs communication is made. In step 102 or S112, a check is made as to whether or not the interface 13 of the target PC is used by the monitoring program 14A or the programming function program 15A, by means of the function of an OS 17, such as a semaphore.

If it is determined in step S102 or S112 that the interface 13 is used, processing returns to main processing. In contrast, if the interface 13 is determined not to be used, a semaphore is set in step S103 or S113 in order to represent that the interface 13 is in use. In order to prepare a report data block (hereinafter referred to as a "packet") to be exchanged, the address data 14b or 15b unique to the target PC that is stored in the monitoring program 14A or the programming function program 15A (step S104 or S114) is referred to, whereby a request packet to be sent to the PC 6 which is the object of communication is prepared (step S105 or S115).

In step S106 or S116, the thus-prepared packet is transmitted to the target PC 6.

In step S107 or S117, the PC peripheral apparatus awaits a response packet sent from the PC 6. If the PC peripheral apparatus receives a response packet from the PC, processing in response to the response packet is performed in step S108 or S118. Finally, in step S109 or S119, the semaphore is reset to terminate communication, and processing returns to the main program.

FIG. 13 shows a request packet to be sent to the PC. In the drawing, reference 18 designates a request packet comprising a request code 181, a data length 182, and data 183.

Particularly, reference numeral 18a designates a PC 6a packet used when the programming function program 15A makes a request to the PC 6a for reading 100 bytes of data from the memory of the PC.

Reference numeral 181a designates a request code used when the programming function program 15A makes a request to the PC 6a for reading data from the memory of the PC, and the request code 181a includes "memory read 2," for example. Reference numeral 182a designates a data length representing the length of data, and the data length 182a includes "data length 3," for example. Reference numeral 183a designates data used for reading 100 bytes of data from the memory of the PC, and the data 183a includes a "header address" and a "by length 100," which are acquired from the unique address data 14b and 15b (i.e., PC memory header addresses).

The packet is changed according to the type of the PC and a communications medium. The header address 183a must be set through use of the unique address data 14b and 15b of respective application programs.

As mentioned above, when exchanging data with a PC, the conventional PC peripheral apparatus retains and handles within a program area address data unique to the PC and PC access data. As a result, application programs such as a programming function program and a monitoring program become larger in size and more complicated. Complication of the application programs hinders an increase in processing speed.

If any change, such as the change of an address, arises in the PC itself, and the configuration of the packet is changed, or if another PC is further added to the PC peripheral apparatus, the PC access data and unique address data must be changed, which in turn involves changing of internal processing of the respective programs.

Transmission of data to the internal memory of the PC and receipt of data from the internal memory of the PC are directly performed with respect to actual memory by the respective programs. Further, the data are processed before transmission or after receipt. by means of internal processing of the program. For these reasons, data must be processed at all times through use of data configuration matching the specification of the PC, thereby complicating the processing.

DISCLOSURE OF THE INVENTION

The present invention has been conceived to solve the foregoing problems, and a data processing apparatus is provided with a communications manager for managing communication with a device to be controlled. Data are exchanged between the data processing apparatus and the device to be controlled by way of the communications manager. Data unique to each of the devices to be controlled are held in the data processing apparatus in the form of application programs. An application program, which exchanges data with the device to be controlled, does not need to perform data processing depending on the type of device to be controlled and may be performed according to predetermined procedures.

To achieve the above object, there is provided a data processing apparatus comprising:

an application program which makes a request through use of a unified common packet in order to control a device to be controlled connected to the data processing apparatus by way of a communications line;

a communications manager which receives the common packet from the application program and converts the common packet into a real packet for submitting a control request to the connected device to be controlled; and communications means which outputs the real packet converted by the communications manager to the device to be controlled.

Preferably, the communications manager acquires retained data according to the details of the request set in the common packet and converts the data into an actual packet.

Preferably, the data acquired by the communications manager correspond to address data for which an internal data area is set in the device to be controlled which serves as an object of transmission of the real packet.

Preferably, the communications manager comprises:

request command classification means which receives the common packet from the applications program and outputs a virtual packet corresponding to the device to be controlled, on the basis of the number of a device to be controlled set in the common packet;

resource management means for managing data used for establishing connection with the device to be controlled; and means for preparing a packet according to the type of a device which prepares an actual packet on the basis of the virtual packet output from the request command classification means and the data acquired by the resource management means.

Preferably, when preparing an actual packet on the basis of a virtual packet, the means for preparing a packet according to the type of a device outputs a resource request packet to the resource management means, thereby acquiring data from the resource management means.

There is also provided a data processing apparatus comprising:

an application program which makes a request through use of a unified common packet in order to control a device to be controlled connected to the data processing apparatus by way of a communications line;

a communications manager which receives the common packet from the application program, converts the common packet into a real packet for submitting a control request to the connected device to be controlled, and virtually executes the operation of the device to be controlled; and emulation means which emulates the operation of the device on the basis of the actual packet converted by the communications manager and sends the result of such emulation to the application program by way of the communications manager.

BEST MODES FOR WORKING THE INVENTION

Embodiments of the present invention will now be described.

First Embodiment

A PC peripheral apparatus according to a first embodiment of the present invention will be described by reference to FIGS. 1 through 4.

Figure 1:
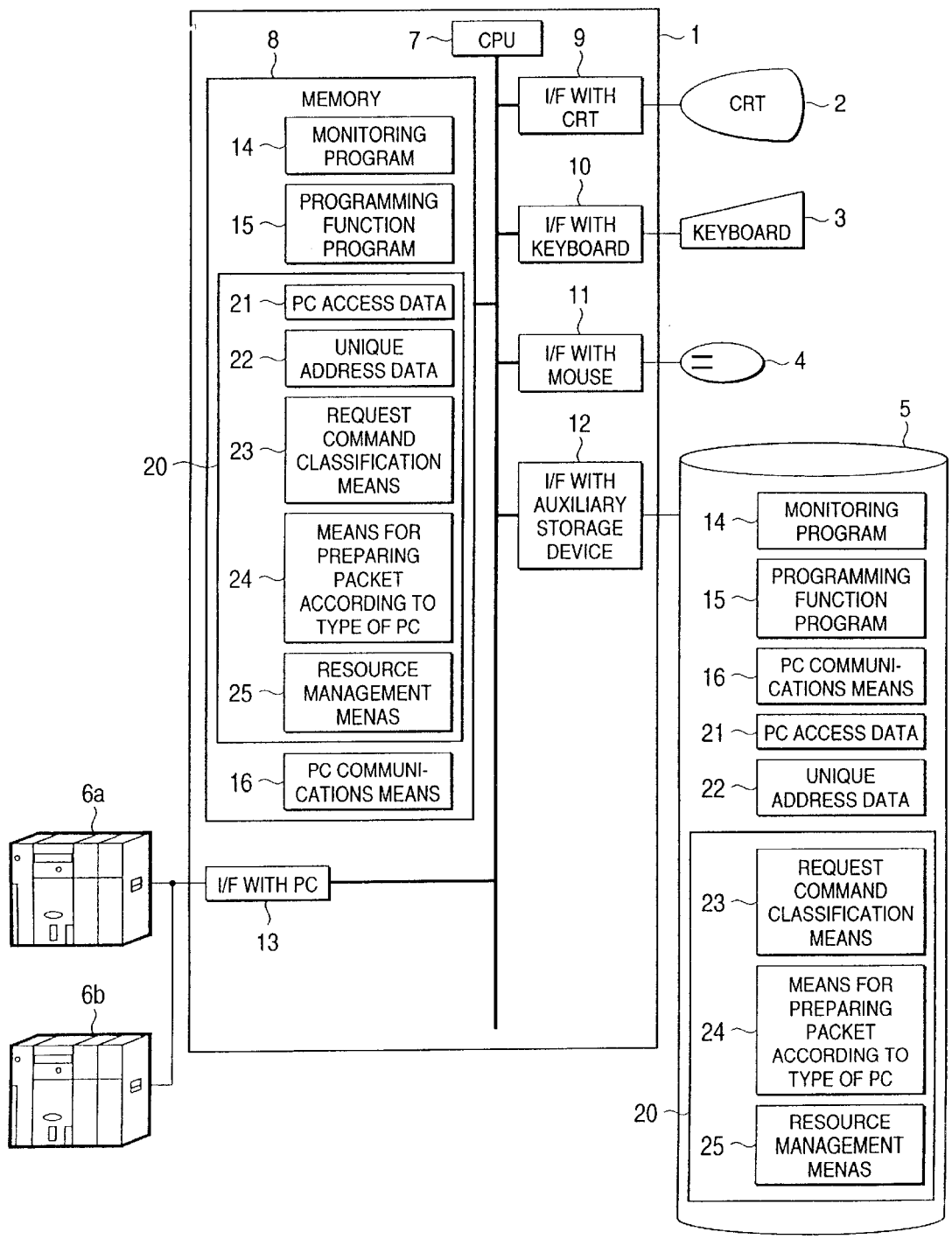
FIG. 1 is a block diagram showing the configuration of a PC peripheral apparatus according to a first embodiment of the present invention.

FIG. 1 is a block diagram showing the configuration of a PC peripheral apparatus according to the present invention. In the drawing, reference numeral 1 designates a PC peripheral apparatus for controlling a CRT 2, a keyboard 3, and a mouse 4, which serve as input/output devices, and PC 6a and PC 6b connected to the PC peripheral apparatus by means of a communications line. The PC peripheral apparatus 1 is equipped with a communications manager according to the present invention.

Reference numeral 5 designates an auxiliary storage device. The auxiliary storage device 5 stores a monitoring program file 14A which collects device data from the PC 6a or 6b and displays the contents of the thus-collected device data on the CRT 2; an application program, such as a programming function program 15A, for offering a program development environment which prepares a user program for activating the PC 6a or 6c; and PC communications means file 16 by means of which the monitoring program 14A and the programming function program file 15A communicate with the PC 6a or 6b.

Reference numeral 6 designates a PC which is connected to the PC peripheral apparatus 1 by way of a communications line and comprises the two PC 6a and PC 6b, whose internal memory devices differ in configuration from each other.

In the PC peripheral apparatus 1, reference numeral 7 designates a CPU which executes a program for communicating with the communications manager 20 and the PC 6; 8 designates work-area memory for a program which establishes communication between the PC peripheral apparatus 1 and the communications manager 20 and the PC 6a and PC 6b; 9 designates an interface with the CRT 2; 10 designates an interface with the keyboard 3; 11 designates an interface with the mouse 4; 12 designates an interface with the auxiliary storage device 5; and 13 designates an interface with the PC 6a and PC 6b.

In the work-area memory 8, the monitoring program 14A, the programming function program 15A, the PC communications means 16, and the communications manager 20, which are stored in the auxiliary storage device 5, are expanded.

The communications manager 20 comprises PC access data 21, unique address data 22, a request command classification means 23, means 24 for preparing a packet according to the type of a PC; and resource management means 25.

The PC access data 21 are used for establishing communication with the PC 6a or 6b. The unique address data 22 include an address specifying which of the PC 6a and PC 6b access is made. The request command classification means 23 serves as a interface with a program for communicating with the PC 6a or 6b and classifies requests by means of a common packet 30. The means 24 converts a virtual PC packet 40 sent from the request command classification means 23 into an actual PC packet 60 for use in accessing an actual PC, or prepares the actual PC packet 60 from the virtual PC packet 40. The resource management means 25 accesses and reads data from the PC access data 21 or the unique address data 22 and manages resources, such as programs, parameters, and device data.

There is no requirement that the PC peripheral apparatus 1 be a dedicated apparatus. The PC peripheral apparatus 1 may be a commercially available personal computer, so long as the apparatus is equipped with at least the previously-described elements.

Figure 2:
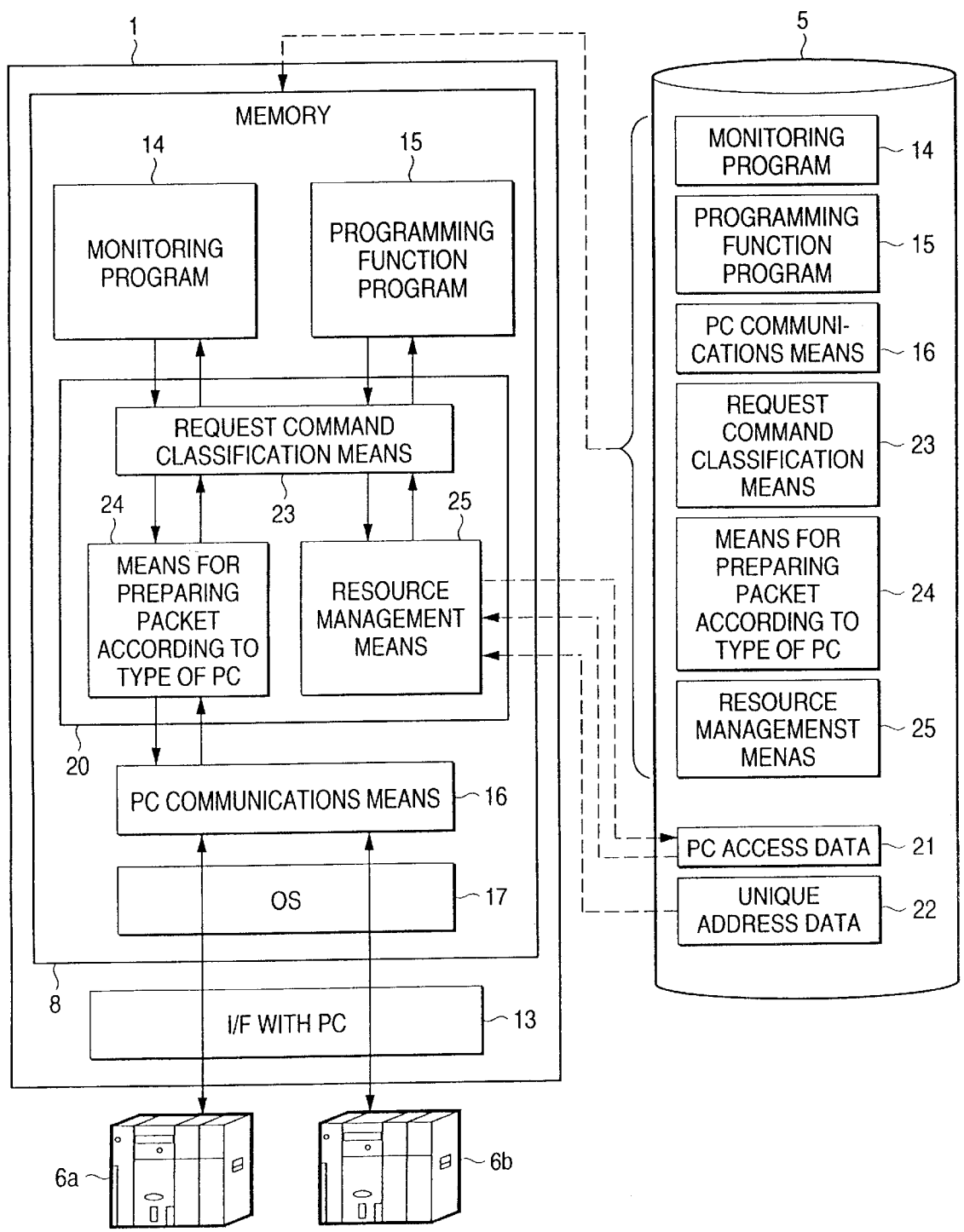
FIG. 2 is a diagram showing configuration of a program which is executed in work-area memory of the PC peripheral apparatus according to the first embodiment.

FIG. 2 shows the configuration of a program which is executed in the work-area memory 8 of the PC peripheral apparatus 1. The program that runs on the work-area memory 8 is stored in the auxiliary storage device 5 and starts operation by being activated by the user through use of the keyboard 3 or the mouse 4.

Figure 3:
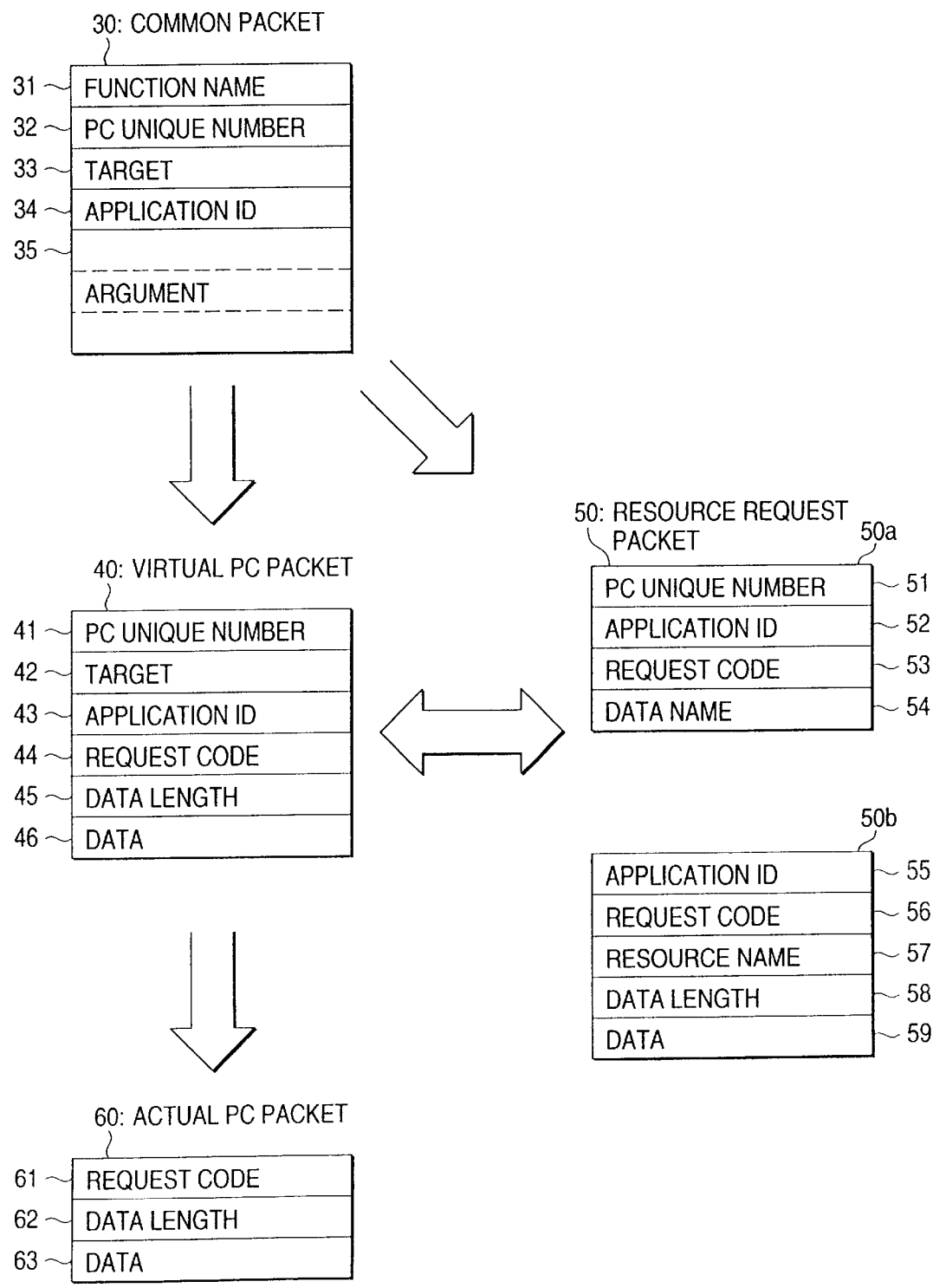
FIG. 3 is a diagram showing the configuration of a packet before and after conversion when an application program according to the first embodiment transmits a packet to and receives a packet from a PC.

FIG. 3 shows the configuration of a packet before and after conversion when the application program transmits a packet to and receives a packet from the PC. In the drawing, reference numeral 30 designates a common packet used when any of the application programs, such as the monitoring program 14 or the programming function program 15, makes a request to the request command classification means 23 of the communication manager 20. The common packet 30 serves as an interface commonly used for access to the PC and access to a resource of the PC. Reference numeral 40 designates a virtual PC packet which corresponds to a data block prepared when the request command classification means 23 analyzes the contents of the common packet 30 and the name of function of the packet 30 represents a request to the PC. Reference numeral 50 designates a resource request packet which are issued when there arises a need for the unique address data 22, such as a PC memory read request, or the PC access data 21. Reference numeral 60 designates an actual PC packet used for establishing actual communication with the PC 6 by way of the PC communications means 16.

The common packet 30 comprises a function name 31 for classification of a resource request and a memory read/write request; a PC unique number 32 assigned to a device to be controlled, for specifying which of the PCs is selected; a target setting 33 for setting a medium used for communicating with a PC; e.g., RS232C or Ethernet; an application ID 34 for identifying a program which is the source of a request, such as the monitoring program 14 or the programming function program 15; and an argument 35 corresponding to data required for each function name.

The virtual PC packet 40 comprises a PC unique number 41 in which a value relating to the PC unique number 32, the target 33, or the application ID 34 of the common packet 30 is substituted; a target 42; an application ID 43; a request code 44 formed by expanding the function name 31 of the common packet 30 to a code which the PC can comprehend; a data length 45 representing the byte length of data 46; and data 46 which are required for each request code 44 and are set as a part of the address obtained as a result of issuance of the resource request packet 50.

The resource request packet 50 is classified as one of two types, according to details of the request. If access is made to the unique address data 22, a unique address data resource request packet 50a is used. In contrast, if access is made to the PC access data 21, a PC access data resource request packet 50b is used. In the resource request packet 50, a PC unique number 51 and application IDs 52 and 55 are formed by substitution of values relating to the PC unique number 32 and the application ID 34 of the common packet 30. Request codes 53 and 56 are expanded so that the PC can identify the function name 31. A data name 54 is a unique address information name desired to be read. A resource name 57 represents the type of PC access data, such as a program or a parameter. A data length 58 represents the byte length of data 59, and the data 59 are data required for each request code 56.

An actual PC packet 60 comprises a request code 61 in which a value relating to the request code 44 of the virtual PC packet 40 is substituted; a data length 62 in which a value relating to the data length 45 of the virtual PC packet 40 is substituted; and data 63 in which the data 46 of the virtual PC packet 40 are substituted.

Figure 4:
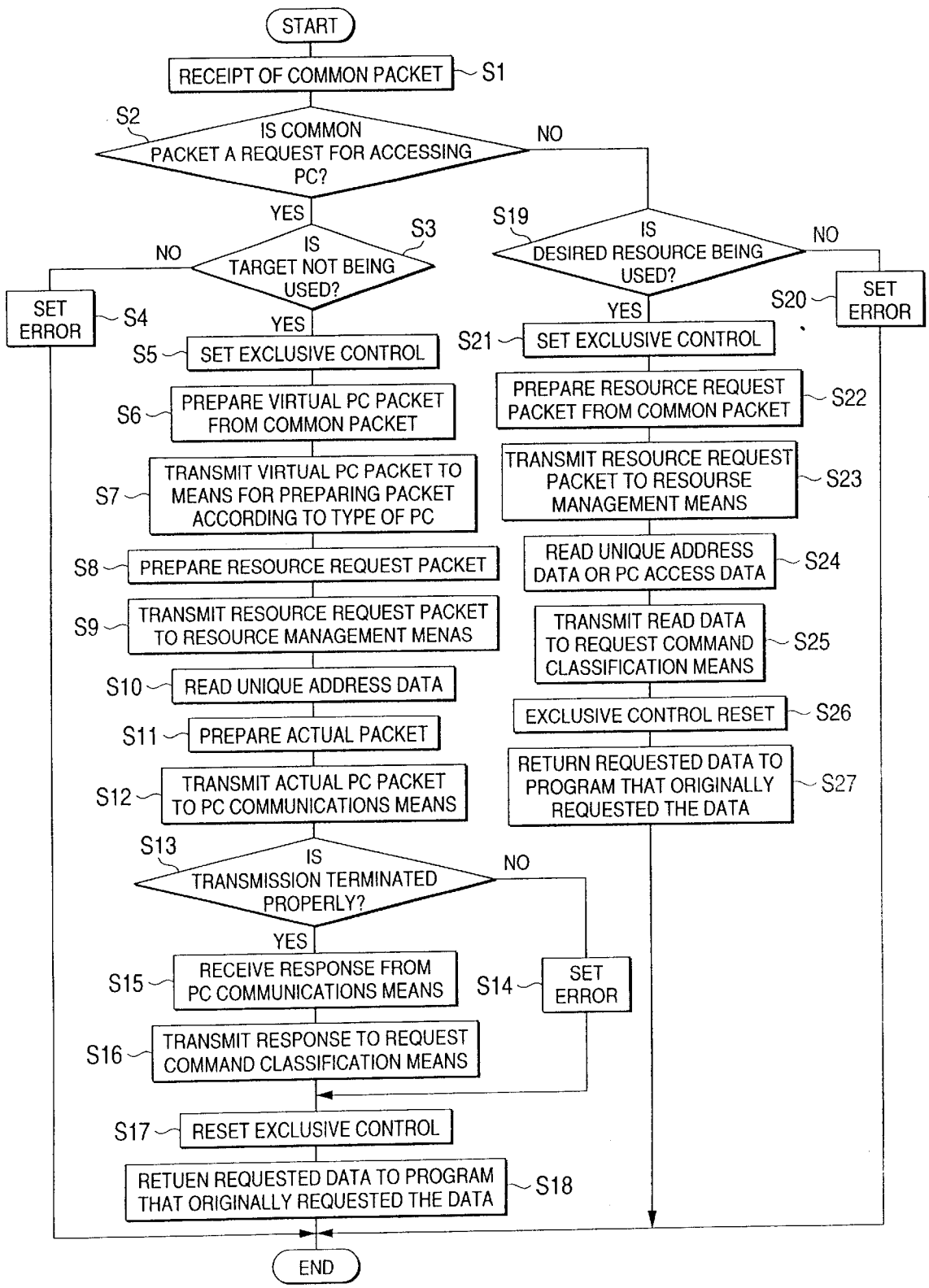
FIG. 4 is a flowchart showing the operation of a communications manager performed when the communications manager receives from a monitoring program or a programming function program a request for reading data from the memory of the PC.

FIG. 4 is a flowchart showing the operation of the communications manager 20 performed when an application program exchanges data with the PC 6a or PC 6b. Particularly, the flowchart shows the operation of the communications manager 20 performed when the communications manager 20 receives from the monitoring program 14 or the programming function program 15 a request for reading data from the memory of the PC 6a or PC 6b.

In the present embodiment, an explanation will be given of an example in which the programming function program 15 reads data from the memory of the PC 6a.

When the programming function program 15 reads data from the memory of the PC 6a, "PC memory read" is set in the function name 31 of the common packet 30. "6a" assigned as a machine number to the PC is set in the PC unique number 32. "RS232C," which is a medium used for establishing communication with the PC, is set in the target 33. "Number," which is unique in a system capable of identifying the programming function program 15, is set in the application ID 34. "Request data size" and "storage buffer address" are set as an argument. The thus-set common packet 30 is transmitted to the request command classification means 23 of the communications manager 20.

The request command classification means 23 receives the common packet 30 (Step S1). In step S2, on the basis of the function name 31, a determination is made as to whether the received common packet 30 corresponds to a request for accessing a PC or a resource request. If in step S2 the received common packet 30 is determined not correspond to any PC access request, processing proceeds to step S19, where the resource request is processed.

In step S3, a determination is made as to whether or not the target 33 set in the common packet 30 is currently being used. If the target 33 is in use, processing proceeds to step S4, where error processing is carried out. In contrast, if the target 33 is not in use, processing proceeds to step S5, where exclusive control is performed so as to exclude similar requests. Subsequently, processing proceeds to step S6.

In step S6, the request command classification means 23 prepares the virtual PC packet 40 from the common packet 30 such that the means classified according to applications can utilize the elements of the common packet 30. More specifically, the virtual PC packet 40 comprises a request code 44 formed by expanding the function name 31 of the common packet 30 to a code which the PC can comprehend; a PC unique number 41 in which a value relating to the PC unique number 32 is substituted; a target 42 in which a value relating to the target 33 is substituted; and an application ID 43 in which a value relating to the application ID 34 is substituted. Processing then proceeds to step S7.

In step S7, the thus-prepared PC packet 40 is transmitted to the means 24 for preparing a packet according to the type of PC, and processing proceeds to step S8.

In step S8, in order to make the virtual PC packet 40 comprehensible to the PC, there is prepared a resource request packet 50 to be sent to the resource management means 25 for the purpose of acquiring the unique address data 22 required for reading data from the memory. In step S9, the resource request packet 50 is sent to the resource management means 25.

The resource management means 25 receives from the means 24 the resource request packet 50 that is transmitted by way of the request command classification means 23. On the basis of the data name 43 of the unique address data resource request packet 50a, PC memory header address data required for reading data from the PC memory are read from the unique address data 22 managed in the auxiliary storage device 5 (step SS10). The unique address data 22 are returned to the means 24 by way of the request command classification means 23.

In step S11, from the contents of the PC memory header address data and the virtual PC packet 40, which are obtained on the basis of the unique address data resource request packet 50a, the means 24 prepares the actual PC packet 60. In step S12, the actual PC packet 60 is transmitted to the PC communications means 16.

In step S13, a check is made as to whether or not communication has been terminated properly. If communication has been terminated improperly, processing proceeds to step S14, where an error is set. In contrast, if communication has been terminated properly, processing proceeds to step S15, where the PC peripheral apparatus 1 receives a response from the PC communications means 16. Data pertaining to the response are converted to a virtual PC packet by means of the means 24, and the this virtual PC packet is returned to the request command classification means 23 (step S16).

Subsequently, exclusive control is reset in step S17, and the request command classification means 23 converts the virtual PC packet to a common packet and returns requested data to the programming function program 15 that has originally requested the data. Processing is then terminated (step S18)

In a case where the communications manager 20 directly makes resource access by way of the monitoring program 14 or the programming function program 15, in step S19 a check is made as to whether or not a resource to be used is being used. If the resource is in use, processing proceeds to step S20, where error processing is performed. In contrast, if the resource is not in use, processing proceeds to step S21, where exclusive control is effected in order to exclude similar requests. Subsequently, processing proceeds to step S22.

In step S22, the request command classification means 23 prepares the resource request packet 50 for the purpose of transferring the function name 31 of the received common packet 30 to the resource management means 25, which is provided with a request code expanded to a code comprehensible to the PC. Processing then proceeds to step S23, where the resource request packet 50 is transmitted to the resource management means 25.

In step S24, on the basis of the request code of the resource request packet 50, the resource management means 25 reads the unique address data 22 or the PC access data 21. The thus-read unique address data 22 or the PC access data 21 are stored in any one of the regions; i.e., the data name 54, the data length 58, and the data 59 of the resource request packet 50, and are returned to the request command classification means 23 (step S25).

In step S26, exclusive control is reset, and the data requested by the request command classification means 23 are returned to the application program that originally made the resource request (in step 27).

As mentioned above, the communications manager 20 is configured such that access from a program, such as the monitoring program 14 or the programming function program 15, which accesses a PC, is made through use of a unified interface comprising the common packet 30, which does not depend on the type or function of a PC. Complicated processing required for the conventional PC is significantly simplified. In the event of a change of specifications of a PC, processing relating to an application program which accesses the PC does not need to be changed, thus enabling the PC peripheral apparatus to readily cope with a change in the system.

Further, the volume of the application program can also be diminished, thereby speeding up the processing of a program itself.

Secound Embodiment

A PC peripheral apparatus according to another embodiment of the present invention will next be described by reference to FIGS. 5 and 6.

Figure 5:
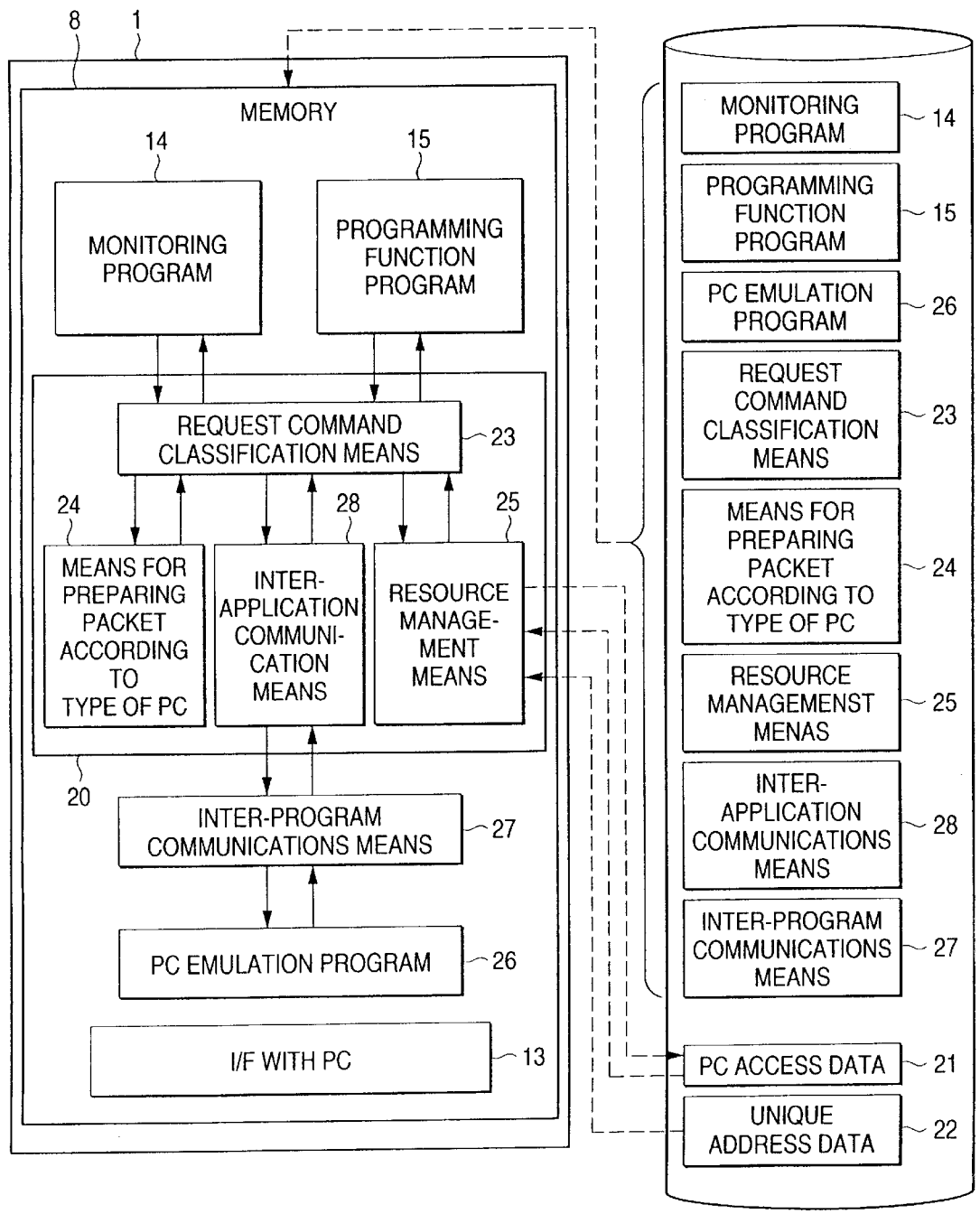
FIG. 5 is a block diagram showing the configuration of a program executed in work-area memory of a PC peripheral apparatus according to a second embodiment of the present invention.

FIG. 5 is a block diagram showing the configuration of a program executed in the work-area memory device of the PC peripheral apparatus. A program to be executed in the memory 8 is stored in the auxiliary storage device 5. Execution of the program starts operation starts with operation by an operator through use of the keyboard 3 or the mouse 4.

In the drawing, reference numeral 26 designates a PC emulation program which operates in the same manner as does an actual PC with respect to a program accessing a PC, such as the monitoring program 14 or the programming function program 15, even when there is no actual connection to hardware. This PC emulation program 26 is used for debugging the system configuration. Reference numeral 27 designates inter-program communications means whose portion for actually accessing a PC is supported by an operating system. Reference numeral 28 designates inter-application communications management means, which exchanges a command requested by the monitoring program 14 or the programming function program 15 with the PC emulation program 28 by way of the inter-program communications means 30.

Figure 6:
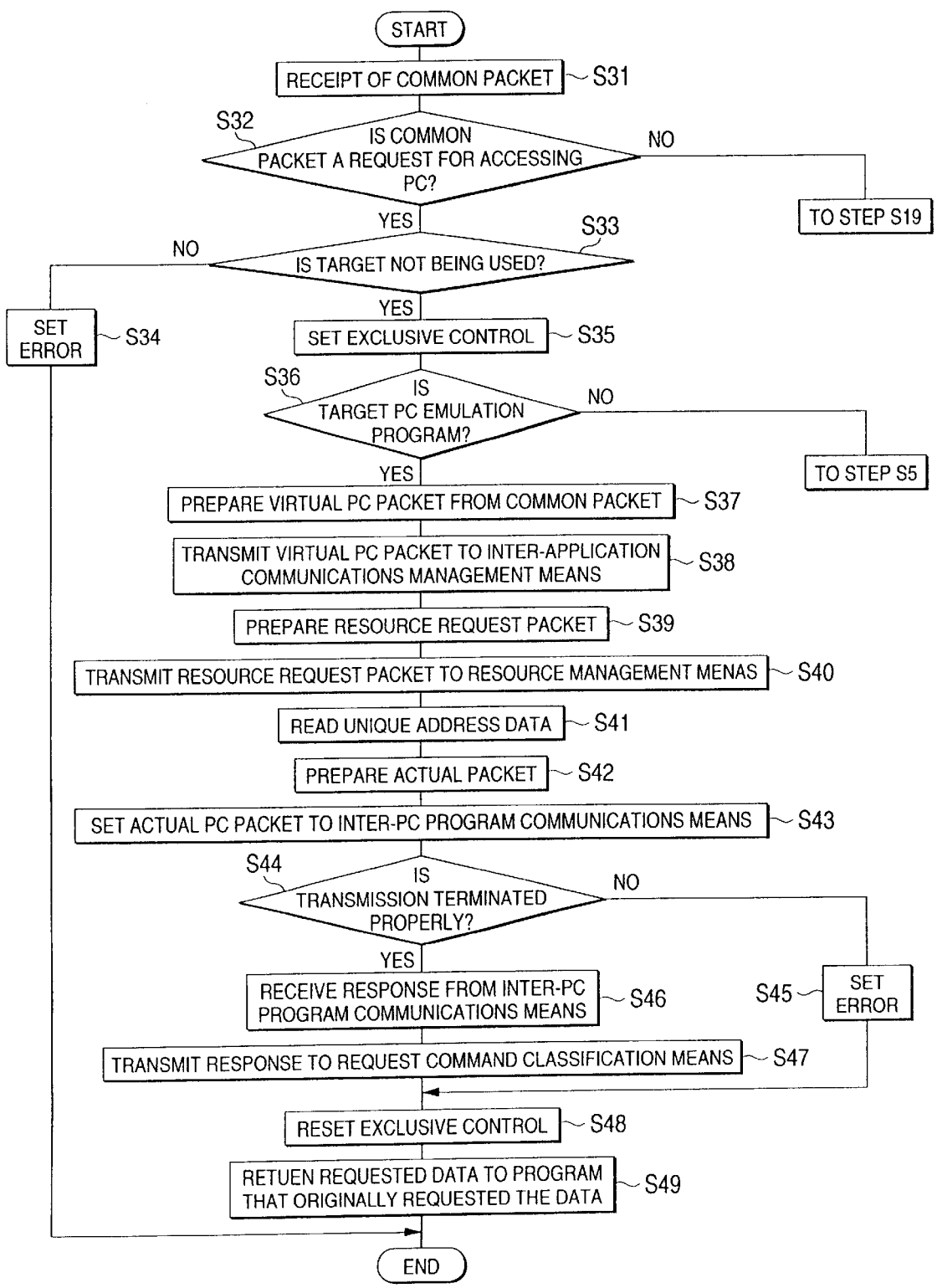
FIG. 6 is a flowchart showing the operation of communications manager performed when the communications manager executes a request for reading data from the memory of a PC, without involvement of connection between a monitoring program or a programming function program and an actual PC.
Figure 7:
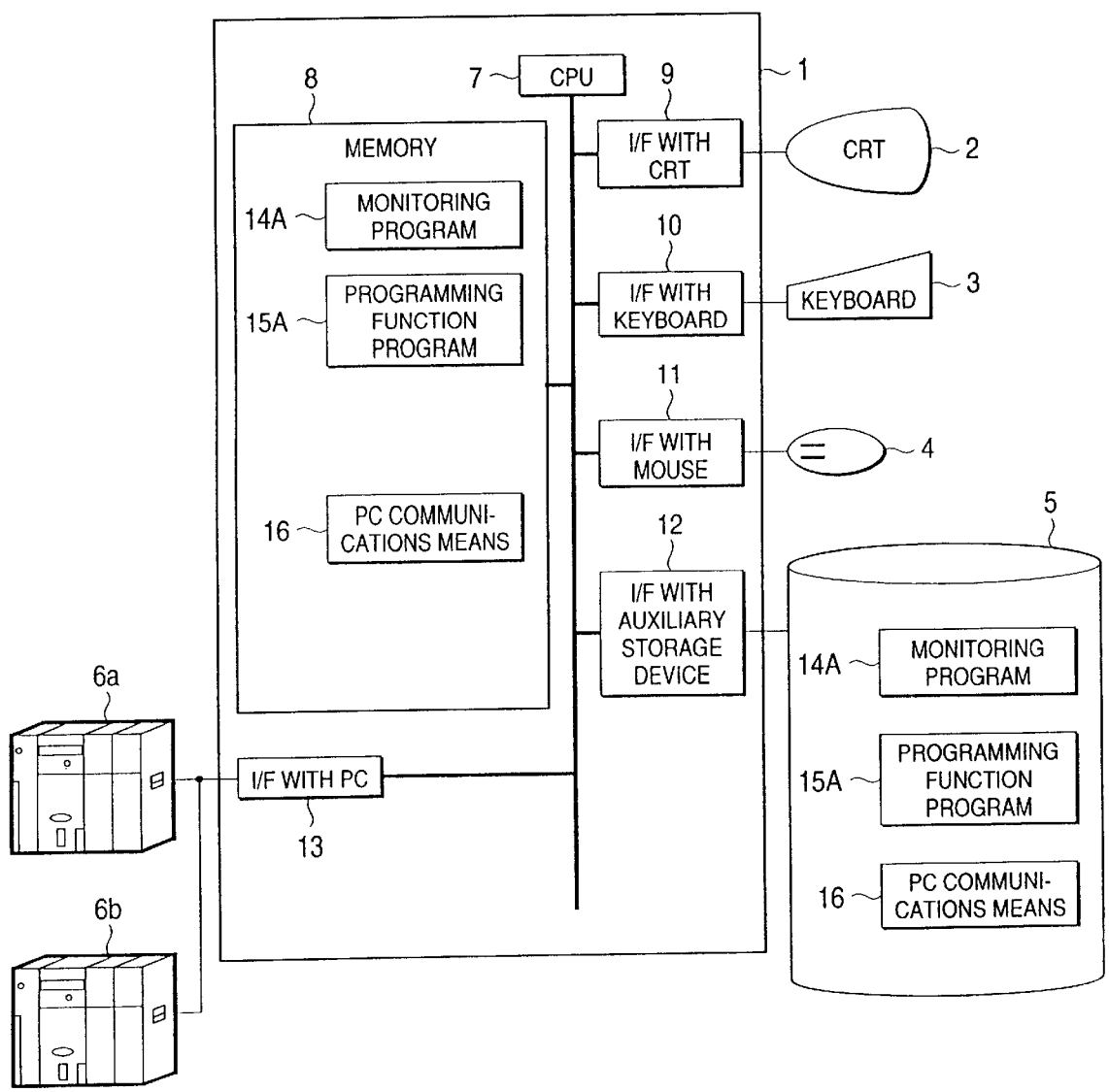
FIG. 7 is a block diagram showing the configuration of a PC peripheral apparatus connected to two types of PCs.
Figure 8:
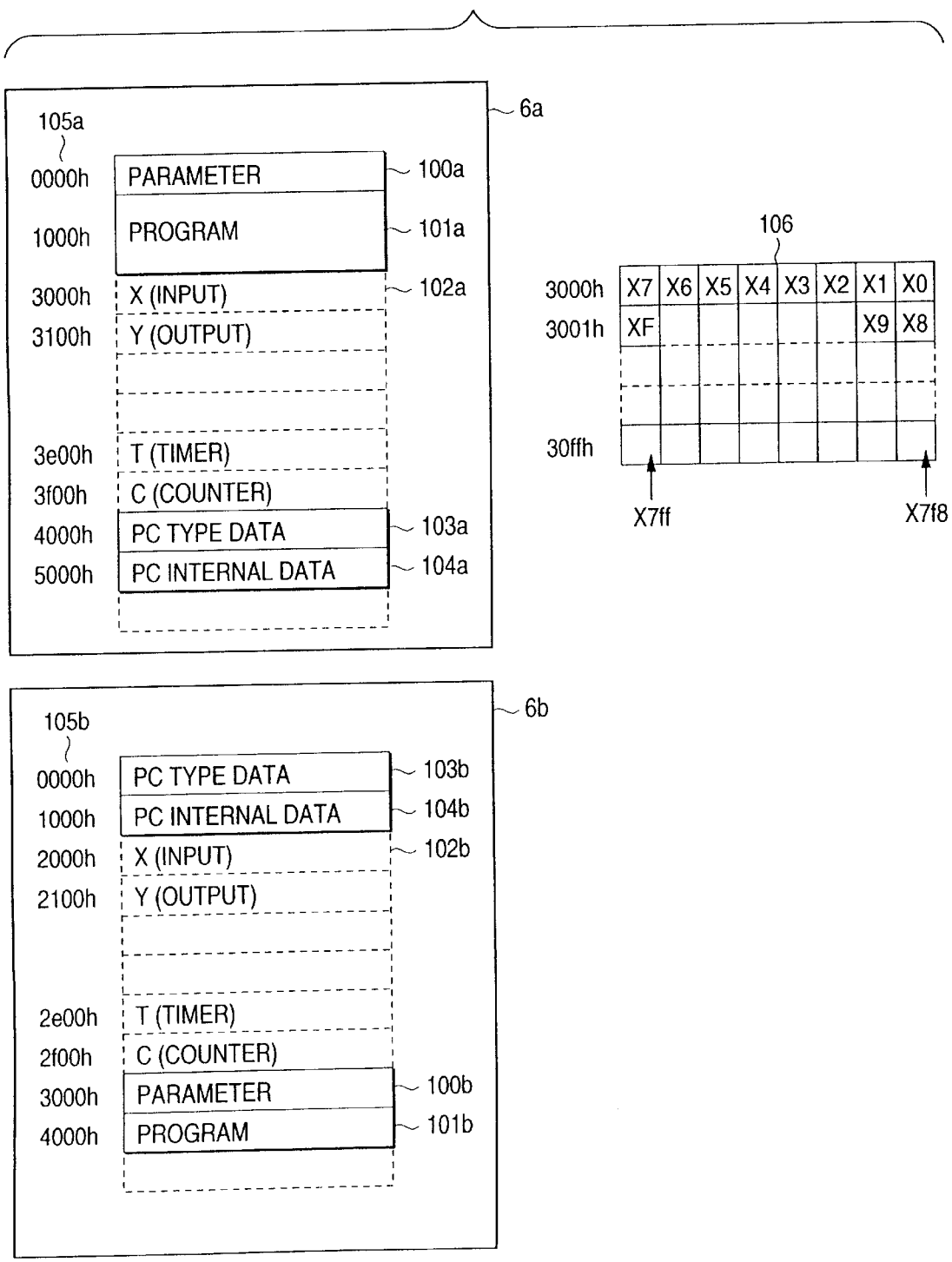
FIG. 8 is a memory status diagram representing the configuration of memory stored in a PC 6.
Figure 9:
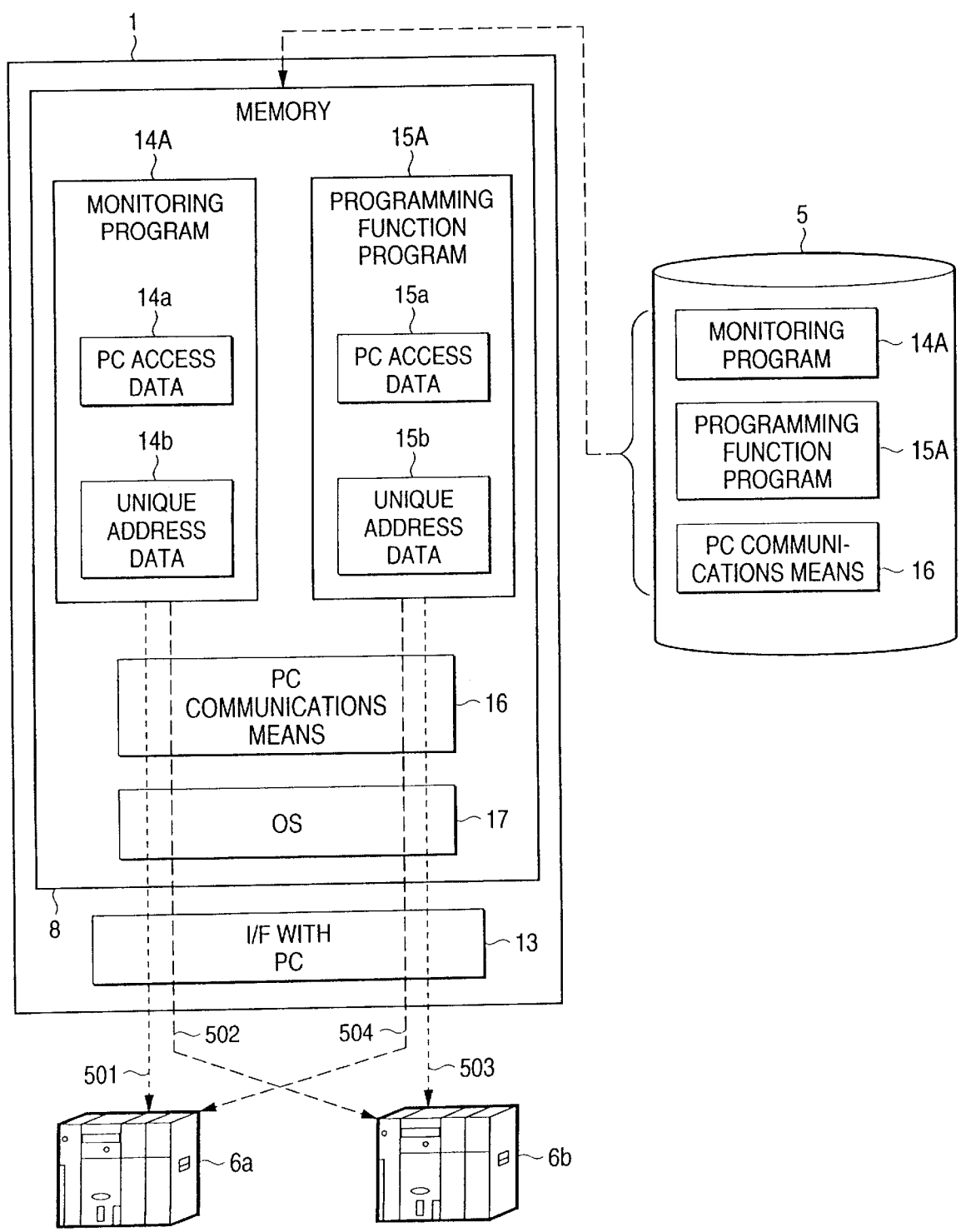
FIG. 9 is a diagram showing the configuration of the software which is executed in work-area memory of a conventional PC peripheral apparatus and the flow of data exchanged between the work-area memory and the PC 6a or 6b.
Figure 10:
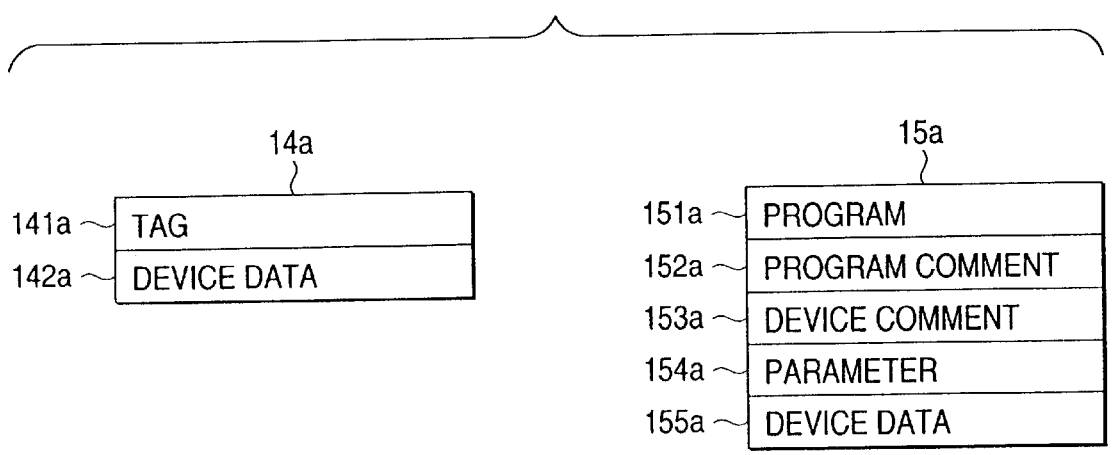
FIG. 10 is a table showing the configuration of PC access data executed in the work-area memory of the conventional PC peripheral apparatus.
Figure 11:
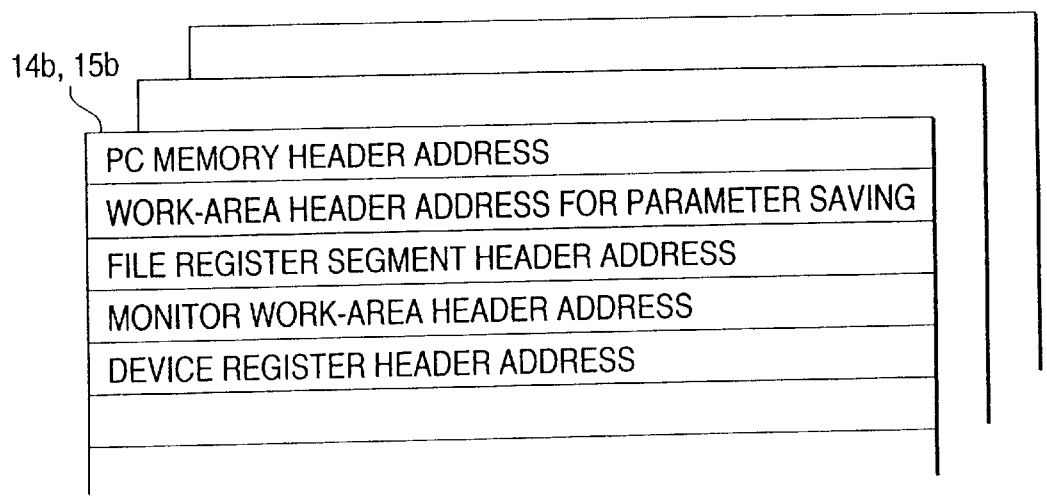
FIG. 11 is a diagram showing address data unique to software executed in the work-area memory of the PC peripheral apparatus.
Figure 12:
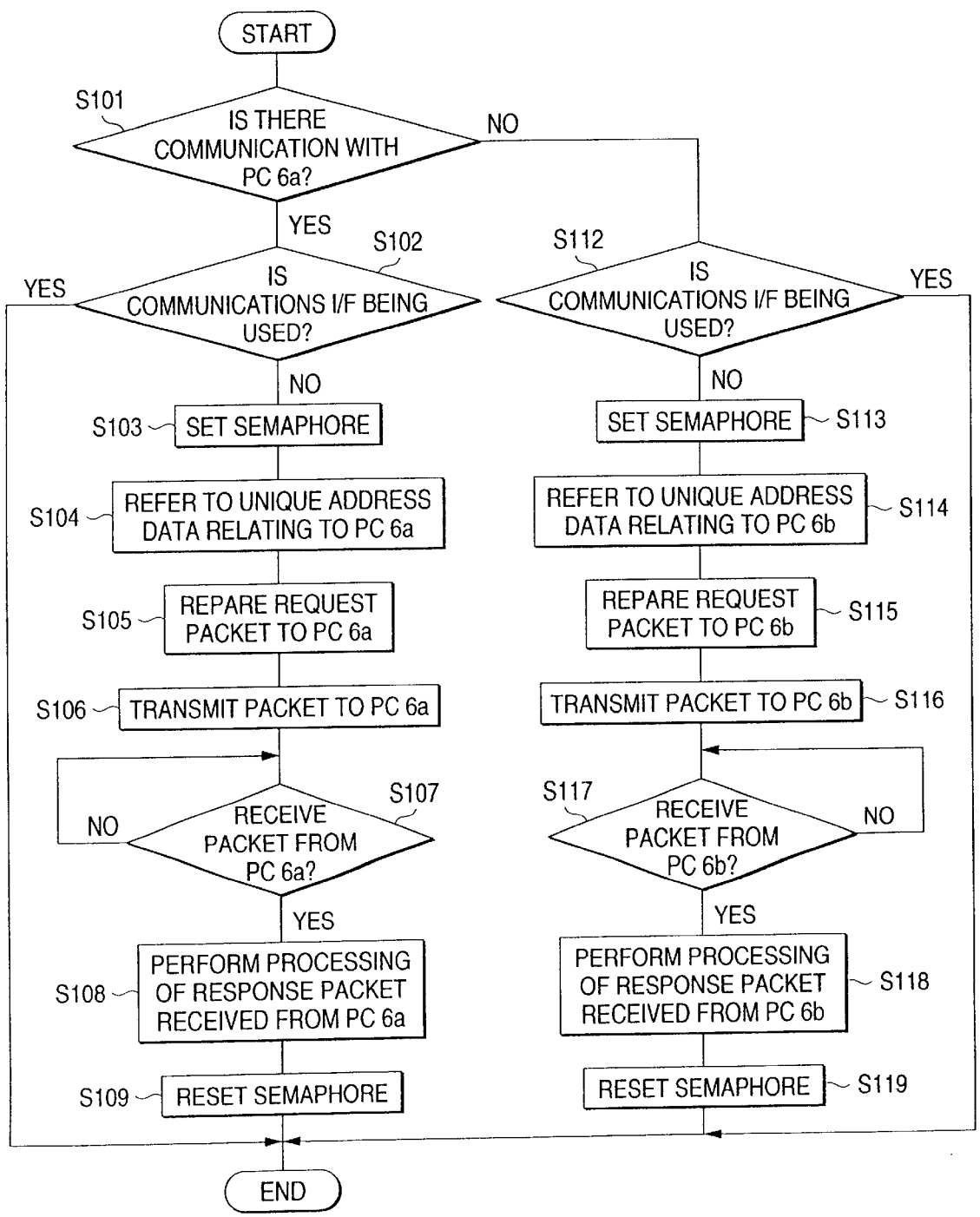
FIG. 12 is a schematic flowchart of a program of the PC communications means that exchanges data with the PC 6a or 6b.
Figure 13:
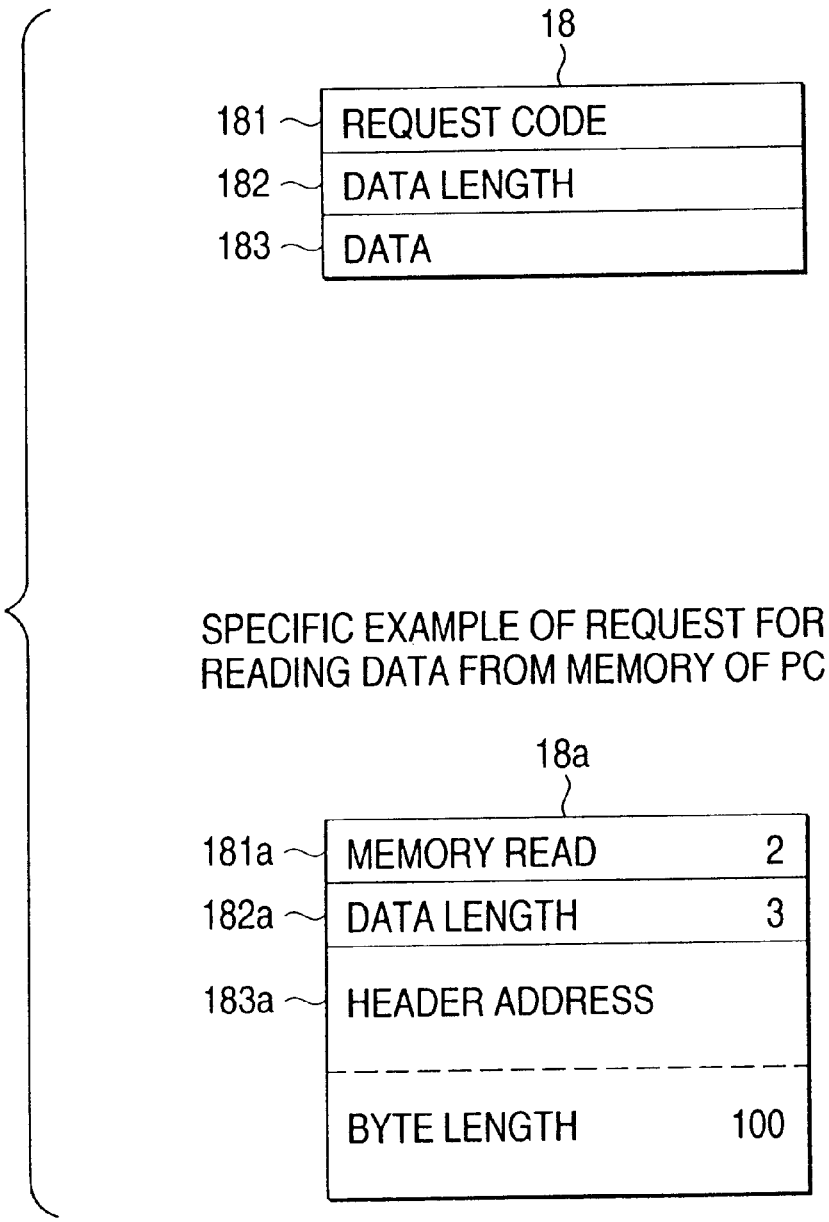
FIG. 13 is a diagram showing a request packet to be sent to the PC.

FIG. 6 is a flowchart showing the operation of the communications manager 20 performed when the communications manager 20 receives a request for reading data from the memory of the PC emulation program 26 from the monitoring program 14 or the programming function program 15.

The second embodiment will be described by reference to an example in which the programming function program 15 reads data stored in the memory of the PC emulation program 26.

When the programming function program 15 reads data stored in the memory of the PC emulator 26, "PC memory read" is set to the function name 31 of the common packet 30. "6a" assigned as a machine number to a PC is set in the PC unique number 32. "PC emulation program" is set in the target 33, and a "number" unique to the system which can be identified by the programming function program 15 is set in the application ID 34. "Request data size" and "storage buffer address" are set in the argument. Subsequently, the thus-set common packet 30 is sent to the request command classification means 23 of the communications manager 20.

The request command classification means 23 receives the common packet 30 (step S30) and, in step S32, determines whether the common packet is a request for accessing the PC or a resource request. In step S32, if the common packet 30 is not a request for PC emulation program access, processing subsequent to the resource request (step S19) shown in FIG. 4 is performed. In contrast, the common packet 30 is a request for PC emulation program access, processing proceeds to step S33.

In step S33, a check is made as to whether or not the target 33 set in the common packet 30 is currently being used. If the target 33 is in use, processing proceeds to step S34, where error processing is performed. In contrast, if the target 33 is not in use, exclusive control is effected in order to eliminate similar requests. Subsequently, processing proceeds to step S36.

In step S36, on the basis of the target 33 of the common packet 30, a determination is made as to whether the common packet 30 is a request for accessing the PC or a request for accessing the PC emulation program 26. If the common packet 30 is a request for accessing the PC, PC access processing relating to steps subsequent to step S5 shown in FIG. 4 is performed.

In step S37, the virtual PC packet 40 is prepared from the common packet 30 such that the means classified according to applications can utilize the elements of the common packet 30. More specifically, the virtual PC packet 40 comprises the request code 44 formed by expanding the function name 31 of the common packet 30 to a code which the PC can comprehend; the PC unique number 41 in which a value relating to the PC unique number 32 is substituted; the target 42 in which a value relating to the target 33 is substituted; and the application ID 43 in which a value relating to the application ID 34 is substituted. Processing then proceeds to step S38.

In step S38, the thus-prepared PC packet 40 is transmitted to the inter-application communications management means 28, and processing proceeds to step S39.

In step S39, in order to make the virtual PC packet 40 comprehensible to the PC emulation program 26, which operates in the same manner as does the actual PC, there is prepared the resource request packet 50 to be sent to the resource management means 25 for the purpose of acquiring the unique address data 22 required for reading data from the memory. In step S40, the resource request packet 50 is sent to the resource management means 25.

The resource management means 25 receives from the inter-application communications management means 28 the resource request packet 50, which is transmitted by way of the request command classification means 23. On the basis of the request code 53 of the unique address data resource request packet 50a, PC memory header address data required for reading data from the PC memory are read from the unique address data 22 managed in the auxiliary storage device 5 (step S41). The unique address data 22 are returned to the inter-application communications management means 28 by way of the request command classification means 23.

In step S42, from the contents of the PC memory header address data and the virtual PC packet 40, which are obtained on the basis of the unique address data resource request packet 50a, the inter-application communications management means 28 prepares the actual PC packet 60. In step S43, the actual PC packet 60 is transmitted to the PC communications means 16.

In step S44, a check is made as to whether or not communication has been terminated properly. If communication has been terminated improperly, processing proceeds to step S45, where an error is set. In contrast, if communication is has been terminated properly, processing proceeds to step S46, where the PC peripheral apparatus 1 receives a response from the inter-program communications means 27. Data pertaining to the response are converted to a virtual PC packet, and this virtual PC packet is returned to the request command classification means 23 (step S47).

Subsequently, exclusive control is reset in step S48, and the data requested by the request command classification means 23 are returned to the programming function program 15 that originally requested the data. Processing is then terminated (step S18).

As mentioned above, access processing of a program, such as access to a PC from the monitoring program 14 or the programming function program 15, is configured such that transmission or receipt of data to or from another program can be effected. Accordingly, there is no requirement that a PC emulation program per se be equipped with functions such as a monitoring program and a programming function program. Consequently, programs can be reduced in size, and the programs can be processed at high speed.

Further, complicated processing, which would otherwise be performed by the PC emulation program, can be simplified.

Industrial Applicability

As has been described, a data processing apparatus according to the present invention is suitable for monitoring and programming PCs connected to the data processing apparatus, as well as for establishing communication with an emulator executed in the data processing apparatus.

What is claimed is:

1. A data processing apparatus comprising:
   an application program which makes a request through use of a unified common packet in order to control a device to be controlled connected to the data processing apparatus by way of a communications line;
   request command classification means which receives the common packet from the applications program and outputs a virtual packet corresponding to the device to be controlled, on the basis of the number of a device to be controlled set in the common packet;
   resource management means for managing data used for establishing connection with the device to be controlled;
   means for preparing a packet according to the type of a device which prepares an actual packet on the basis of the virtual packet output from the request command classification means and the data acquired by the resource management means; and communications means which outputs to the device to be controlled the real packet converted by the means for preparing a packet according to the type of a packet.

2. The data processing apparatus as defined in claim 1, wherein, when preparing an actual packet on the basis of a virtual packet, the means for preparing a packet according to the type of a device outputs a resource request packet to the resource management means, thereby acquiring data from the resource management means.

3. A data processing apparatus comprising:

an application program which makes a request through use of a unified common packet in order to control a device to be controlled connected to the data processing apparatus by way of a communications line;

a communications manager which receives the common packet from the application program, converts the common packet into a real packet for making a control request to the connected device to be controlled, and virtually executes the operation of the device to be controlled ; and emulation means which emulates the operation of the device on the basis of the actual packet converted by the communications manager and sends the result of such emulation to the application program by way of the communications manager.

* * * * *